US008588677B2

(12) United States Patent
Tijink

(10) Patent No.: US 8,588,677 B2
(45) Date of Patent: Nov. 19, 2013

(54) METHOD AND RADIO BEACON FOR TRANSMITTING MESSAGES IN A ROAD COMMUNICATION SYSTEM

(75) Inventor: Jasja Tijink, Breitenfurt (AT)

(73) Assignee: Kapsch TrafficCom AG, Vienna (AT)

( * ) Notice: Subject to any disclaimer, the term of this patent is extended or adjusted under 35 U.S.C. 154(b) by 239 days.

(21) Appl. No.: 13/228,159

(22) Filed: Sep. 8, 2011

(65) Prior Publication Data
US 2012/0071191 A1    Mar. 22, 2012

(30) Foreign Application Priority Data

Sep. 17, 2010 (EP) .................................. 10450147
Dec. 17, 2010 (EP) .................................. 10450192

(51) Int. Cl.
*H04H 20/71* (2008.01)
*H04W 4/06* (2009.01)

(52) U.S. Cl.
USPC ........... 455/3.01; 455/521; 455/434; 455/517

(58) Field of Classification Search
USPC .................. 455/3.01, 3.03, 3.04, 3.05, 414.1, 455/414.2, 419, 420, 434, 435.3, 67.11, 455/515, 521, 62, 411, 517, 456.3, 454, 455/435.1, 512; 340/928
See application file for complete search history.

(56) References Cited

U.S. PATENT DOCUMENTS

| 2003/0109223 A1 | 6/2003 | Toyama | |
|---|---|---|---|
| 2010/0245126 A1* | 9/2010 | Kohli et al. | 340/928 |
| 2010/0290443 A1* | 11/2010 | Gabel | 370/338 |

FOREIGN PATENT DOCUMENTS

| DE | 196 05 654 A1 | 8/1996 |
|---|---|---|
| DE | 102 58 653 A1 | 9/2003 |
| EP | 0 767 446 A2 | 4/1997 |
| EP | 1 172 766 A1 | 1/2002 |
| EP | 1 768 070 A2 | 3/2007 |
| EP | 2 058 992 A1 | 5/2009 |
| WO | WO 2009/039818 A2 | 4/2009 |
| WO | WO 2010/105348 A1 | 9/2010 |

OTHER PUBLICATIONS

Extended European Search Report for corresponding European Patent Application No. 10 450 147.3, dated Mar. 4, 2011, 10pp.
Extended European Search Report for corresponding European Patent Application No. 10 450 192.9, dated Feb. 28, 2011, 8pp.
Kapsch; GSS; Global Specification for Short Range Communication; The platform for Interoperable Electronic Toll Collection and Access Control; V 3.2; Aug. 2003; 66pp.

* cited by examiner

*Primary Examiner* — John J Lee
(74) *Attorney, Agent, or Firm* — Christie, Parker & Hale, LLP

(57) ABSTRACT

A method and a radio beacon for transmitting messages between a radio beacon and multiple onboard units passing this with unique identifiers in a road toll system, wherein the messages respectively provided with an identifier of an onboard unit are stored in a buffer memory of the radio beacon for sequential processing or despatch. The method including determining, of each onboard unit entering the transmitting-receiving area of the radio beacon, at least one characteristic of the onboard unit, sorting the messages present in the buffer memory under the identifiers depending on the characteristics determined for these identifiers, and sequentially processing or despatching the messages from the buffer memory in the sequence they were sorted.

12 Claims, 2 Drawing Sheets

METHOD AND RADIO BEACON FOR TRANSMITTING MESSAGES IN A ROAD COMMUNICATION SYSTEM

CROSS-REFERENCE TO RELATED APPLICATION(S)

This application claims priority to European Patent Application No. 10 450 147.3, filed on Sep. 17, 2010 and European Patent Application No. 10 450 192.9, filed on Dec. 17, 2010, the contents of which are hereby expressly incorporated by reference.

FIELD OF THE INVENTION

The present invention relates to a method and a radio beacon (roadside equipment, RSE) for transmitting messages between the radio beacon and onboard units (OBUs) in a road communication system.

BACKGROUND

In interoperable road communication systems radio beacons must be able to interact with a plurality of onboard units of different manufacturers, which respectively have different message transmission and receive characteristics or capabilities, such as transmitting power, receive sensitivity, bandwidth, latency, scope of data etc. This situation is exacerbated further by the circumstance that the vehicles carrying the onboard units travel past the radio beacon at different speeds and in different directions, which causes a further disparity in the times and channel qualities of transmission available for message transmission.

SUMMARY

The present the invention is a method and a radio beacon, which take into consideration these greatly varying requirements and allow messages to be transmitted with optimum quality to a plurality of different onboard units moving in different ways.

In some embodiments, the invention is a method for transmitting messages between a radio beacon and multiple onboard units (OBUs) passing this with unique identifiers in a road communication system. Each message includes an identifier of an onboard unit that is stored in a buffer memory of the radio beacon for sequential processing or despatch. The method includes determining, of each onboard unit entering the transmitting-receiving area of the radio beacon, at least one characteristic of the onboard unit by receiving in the radio beacon information transmitted together with a message from the onboard unit relating to a characteristic of the onboard unit; sorting the messages present in the buffer memory under the identifiers depending on the characteristics determined for these identifiers; and sequentially processing or despatching the messages from the buffer memory in the sequence they were sorted.

In some embodiments of the invention, the characteristics of the OBU may be as follows:

a. an operating mode, which the OBU was in before the first contact was made with the radio beacon, i.e. a working or resting mode. Thus, OBUs, which were woken from a resting mode by the radio beacon, that requires a certain time, and which therefore can be assumed to be available for just a short time until they leave the radio coverage area of the radio beacon again, can be prioritised;

b. the receive sensitivity or the transmitting power of the OBU; i.e. the OBU indicates its radio capabilities, so that the radio beacon can take these into account when prioritising the OBUs;

c. an operating mode, which the OBU is in during transmission of the message, i.e. the number of unsuccessful attempts (retries) to transmit a message so far; this enables OBUs that have been trying for a longer period to send a message, can be given higher priority;

d. the fill level of a memory of the OBU, e.g. a message transmission buffer of the OBU or a route point recording memory of the OBU, so that OBUs that are at risk of memory overload, can be given higher priority; or e. the position and/or the motion vector of the OBU, which can be measured by this, preferably by means of satellite navigation. The time available for the message transmission with the OBU can be estimated or extrapolated from this information taking into consideration the radio coverage area of the radio beacon, and thus OBUs that are only available for a short time can be given higher priority than OBUs available for a longer time.

In some embodiments, a previously stored list with characteristics and assigned sorting priorities is used, so that the sorting process can be implemented as rule-based system.

The sorting is may be conducted once again upon determination of a new characteristic of an OBU to constantly keep the buffer memory up to date.

In some embodiments, the invention is a radio beacon for a road communication system for transmitting messages between the radio beacon and multiple onboard units (OBUs) passing this with unique identifiers. The radio beacon includes: at least one buffer memory, in which the messages respectively provided with an identifier of an onboard unit are stored for sequential processing or despatch; and a transceiver coupled to the buffer memory; a determining means for determining for each onboard unit entering the transmitting-receiving area of the radio beacon whether a message from an onboard unit is related to at least one characteristic of the onboard unit, and a sorting means for the buffer memory, which is connected to the determining means and is configured for the purpose of sorting the messages present in the buffer memory under the identifiers depending on the characteristics determined for these identifiers.

For example, the radio beacon can receive the messages from other units in the road communication system, e.g. a central control unit, a proxy or another radio beacon. In some embodiments, the radio beacon has at least one software application running on it, which feeds messages into the buffer memory for despatch to the onboard units.

A software application can also receive messages from the buffer memory in the sort sequence thereof for processing, for example, the buffer memory can lie both at the "input" and at the "output" of one or more software applications of the radio beacon.

DETAILED DESCRIPTION

The present invention is based on a new approach to sort and prioritise the messages to be despatched to or received from OBUs for processing, depending on characteristics of the OBU from which a message is received. This differs from known prioritised transmission protocols such as wireless access in a vehicle environment (WAVE), in which messages despatched to or received from OBUs are prioritised, depending on the characteristics or priority details of the communication partners of the OBUs. Such communication partners are generally applications that run on the radio beacon or systems connected thereto and e.g. can have different priorities. Thus, messages from applications relating to, for example, road safety generally have higher priority than from applications that "only" relate to, for example, charging tolls on vehicles. In the known receive protocols, the prioritisation of the messages therefore occurs in an application-based manner.

In contrast, in the case of the present invention, the prioritisation of the messages occurs in the transmission or processing buffer memory in an OBU-based manner. As a result, OBUs that have low transmitting power that soon leave the communication zones, could ultimately not transmit or are stored in a white list, for example, can be prioritised over other OBUs. The method of the present invention thus allows a plurality of new and advantageous detail solutions that will be explained in more detail below.

In the present invention the term "road communication system" is understood to mean any type of electronic vehicle-to-infrastructure system such as electronic traffic telematic, traffic monitoring, traffic control and traffic warning systems, electronic toll systems, infrastructure-based road safety and travel advisory driver information systems or the like.

A method of the above-mentioned kind is described in EP 1 172 766 A1, the contents of which are hereby expressly incorporated by reference.

Figure 1:
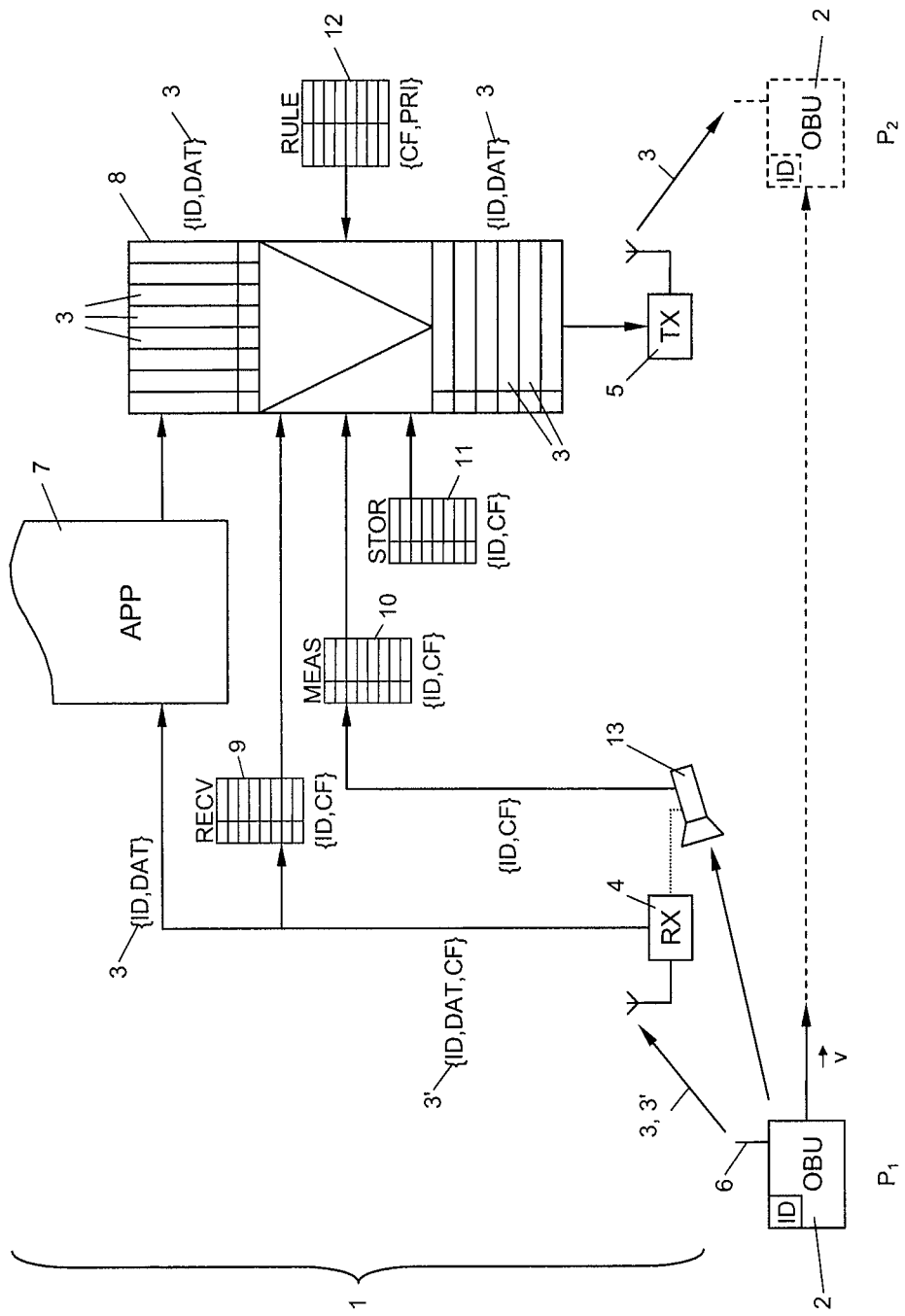
FIG. 1 is a block diagram and a signal flow diagram, according to some embodiments of the present invention.

FIG. 1 shows a radio beacon 1 of a road toll system, which may be set up, for example, as roadside equipment (RSE) on toll roads, in car parks etc. The radio beacon 1 can connect with a central control unit (not shown) of the road toll system to enable tolls to be charged to vehicles (not shown) for location usage by communicating with onboard units (OBUs) 2 that are carried by the vehicles.

Although the present exemplary embodiment is given for a road toll system, the radio beacons 1 and OBUs 2 can also be part of any other electronic road communication or vehicle-to-infrastructure system, e.g. an electronic traffic telematic, monitoring, control or warning system, an electronic toll system, a road safety or travel advisory driver information system or the like, and all references to a "road toll system" also encompass references to such systems.

An OBU 2 is shown as representative of how it moves from a first position $P_1$ with a motion vector $\vec{v}$ representing its speed and direction to a second location $P_2$ within the radio coverage area of the radio beacon 1.

The radio beacon 1 and the OBU 2 exchange messages 3 with one another, for which purpose the radio beacon 1 is equipped with a receiver 4 and a transmitter 5 that can also be combined to a transceiver. The OBU 2 also has a transceiver 6 suitable for this purpose as well as an identifier ID, with which it can be uniquely identified in the road toll system.

The identifier ID can be permanently assigned to the OBU 2, e.g. input into a permanent, semi-permanent or volatile memory of the OBU 2, in a similar manner to a device address or MAC address, or can be assigned to the OBU 2 only temporarily—for the purpose and duration of a unique communication in the road toll system—in a similar manner to a communication address or IP address.

Besides useful data DAT, the exchanged messages 3 also respectively comprise the identifier ID of the OBU 2, from which they originate or to which they are directed, to identify their origin from this OBU 2 or so that they can be addressed to this OBU 2.

In the embodiment represented in FIG. 1, the messages 3 to be despatched to the OBUs 2 are generated by one (or more) software applications 7 running on the radio beacon 1 (or a system connected thereto) that can also itself receive messages 3 from the OBUs 2. Accordingly, the messages 3 can also be data packages of a bidirectional radio communication between the radio beacon 1 and the OBUs 2. However, "pure" transmission messages 3 ("broadcasts") can also be sent out by the radio beacon 1 to appropriate OBUs 2 or "pure" receive messages 3 can be transmitted by passing OBUs 2 to a radio beacon 1 on their route.

The messages 3 generated by the software application 7 are passed to the transmitter 5 of the radio beacon 1 via a buffer memory 8. The buffer memory 8 is a FIFO (first-in first-out) stack in basic design, from which the messages 3 present therein in their "sort sequence" are passed consecutively to the transmitter 5 for despatch. However, the buffer memory 8 is modified insofar as the sort sequence of the messages 3 located therein is variable, i.e. by a sorting means with components 9-12.

The sorting array 9-12 sorts (prioritises) the messages 3 in the buffer memory 8 according to characteristics CF of the OBUs 2. The characteristics CF of the OBUs 2 are determined by a determining means 4, 13, which comprises the receiver 4 and/or a separate measuring means 13 of the radio beacon 1. Characteristics CF can be received directly from the OBUs 2 by means of the receiver 4 if these disclose their characteristics CF themselves. The characteristics CF can be measured from the radio beacon 1 by means of the measuring means 13.

Characteristics CF received by the receiver 4 can be transmitted jointly with the messages 3 transmitted by the OBU 2 to the radio beacon 1 in the form of modified or supplemented messages 3' and are thus each also provided with an identifier ID of the OBU 2. Characteristics CF measured by the measuring means 13 must firstly be assigned to the respective OBU 2 or the identifier ID thereof. Further, the measuring means 13 can be coupled to the receiver 4, for example, to also receive the identifier ID of the respectively measured OBU 2 for measurement of a characteristic CF.

The characteristics CF determined by the receiver 4 of the determining means 4, 13 are filed under the identifier ID of the OBU 2, for example, in a first memory 9 of the sorting means 9-12. In the same way, the characteristics CF measured by the measuring means 13 can also be filed under the respective identifier ID in a second memory 10 of the sorting means 9-12.

In some embodiments, the sorting means 9-12 includes a third memory 11 with characteristics CF previously stored for specific identifiers ID. These previously stored characteristics CF can characterise, for example, specific types of OBU 2 that are to be prioritised, e.g. OBUs of emergency vehicles etc., or can come from a determination of characteristics CF by the determining means 4, 13 of other radio beacons 1 that the OBU 2 has passed, which were disclosed via the data connections of the road toll system.

It is to be understood that not all the components 4, 13 of the determining means and not all of the components 9-12 of the sorting means need to be present.

The sorting means 9-12 may additionally have a table 12 ("rules set") with characteristics CF and priorities PRI assigned to these. If the considered characteristic CF of the OBU 2 is its speed $\vec{v}$, for example, a high priority PRI can be given e.g. to a high speed $CF=\vec{v}$, since it is to be assumed that a fast OBU 2 will rapidly leave the radio coverage area of the radio beacon 1 again and therefore there will only be a short time available for radio communication with the OBU 2.

The sorting means 9-12 now sequences or sorts the messages 3 present in the buffer memory 8 under identifiers ID, i.e. according to the characteristic CF that was determined for the respective identifier ID by the determining means 4, 13 and filed in the memories 9-11. The exact sorting priority PRI of the significance of a specific characteristic CF can be taken from table 12.

As a result, the messages 3 can be processed and despatched from the buffer memory 8 in a sequence that depends on the characteristics CF of the OBUs 2 passing the radio beacon 1. Exemplary characteristics CF of the OBUs 2 in this case may be as follows:

A) if CFs are disclosed by the OBU 2 itself:
an operating mode, which the onboard unit 2 was in before the first contact was made with this radio beacon 1, in particular whether before this first contact ("waking") it was in a working mode or a power-saving resting mode (sleep mode). The latter indicates that a certain time span may already have elapsed because of the time necessary for waking and in this time the OBU 2 has moved forwards in the radio coverage area of the radio beacon 1 by virtue of its speed $\vec{v}$, and therefore there will only be a short time left available for further radio communication. As a result, OBUs 2 that "have gone to sleep" are prioritised over OBUs 2 that were already "awake";

a receive sensitivity and/or the transmitting power of the OBU 2, so that OBUs with weaker transmission, or those where it is to be expected that contact will be more difficult, can be prioritised;

an operating mode, which the OBU 2 is in during direct or current transmission of the message, i.e. the number of unsuccessful attempts (retries) to transmit a message 3 so far, possibly also to earlier radio beacons 1 on their route, so that such OBUs 2 can be prioritised;

the fill level of a route point recording memory in an OBU 2, which measures its positions, for example, and stores these as "position fix tracks" in order to transmit these to radio beacons on their route; as a result, OBUs with a full route point recording memory can be prioritised to prevent memory overload;

the fill level of a transmission buffer memory in the OBU 2 to also prevent a buffer overload there; or the position P1 and/or the motion vector $\vec{v}$ of the OBU 2, which this can determine or disclose itself, for example, independently by means of satellite navigation (global navigation satellite systems GNSS) or by radio localisation in mobile radio networks or the radio field of the radio beacon 1; the further route of the OBU 2 in the radio coverage area of the radio beacon 1 can be extrapolated from this and the time available for the radio communication with the OBU 2 until this leaves the radio coverage area again can thus be estimated; in this way OBUs with which contact for only a short time is to be expected, are prioritised over OBUs that are available for a longer time.

B) if CFs are determined by the determining means 4, 13 of the radio beacon 1:

the above-mentioned position P1 and/or the above-mentioned motion vector $\vec{v}$ of the OBU 2, e.g. in that the measuring means 13 is a radar device, lidar device, laser scanner, sound sensor, a photoelectric barrier, a camera etc., with which this information is measured from the radio beacon 1 in order to prioritise OBUs that are available for a shorter time over OBUs that are available for a longer time, as explained above; or a transmitting power of the OBU 2, which can be measured indirectly in the radio beacon 1 on the basis of the receiving power occurring therein, receive quality, e.g. bit error ratio, signal-to-noise ratio etc. in order to prioritise OBUs 2 with a poor prevailing connection quality, i.e. with which there is the risk that the connection could deteriorate further or be broken;

C) if CFs are previously stored in memory 11:

transmission priorities that are assigned beforehand to specific OBUs 2 with identifiers ID—individually or to specific "classes" of OBUs, e.g. OBUs of a specific manufacturer, a specific type, a specific class of vehicle etc.—e.g. OBUs 2 of emergency vehicles etc.; or any of the characteristics CF mentioned above that were received from previous tests or "experiences" with OBUs 2, e.g. from other radio beacons 1 in the road toll system.

Therefore, the method of FIG. 1 may be configured as follows:

Firstly, at least one characteristic CF of each OBU 2 entering the transmitting-receiving range of the radio beacon 1 is determined, then the messages 3 filed in the buffer memory 9 under the identifiers ID by the software application 7 are sorted depending on the characteristics CF determined for these identifiers ID and filed in memories 9-11, in particular using the rule set table 12 with the definitions of which priorities PRI are assigned to which characteristics CF, and then the messages 3 are despatched in their sort sequence to the OBUs 2 from the buffer memory 8 via the transmitter 5. Every time a new characteristic CF is available for an identifier ID the sorting of the buffer memory 8 is conducted once again to optimally match the sort sequence to the respectively currently available OBUs 2 in the radio coverage area of the radio beacon 1.

Figure 2:
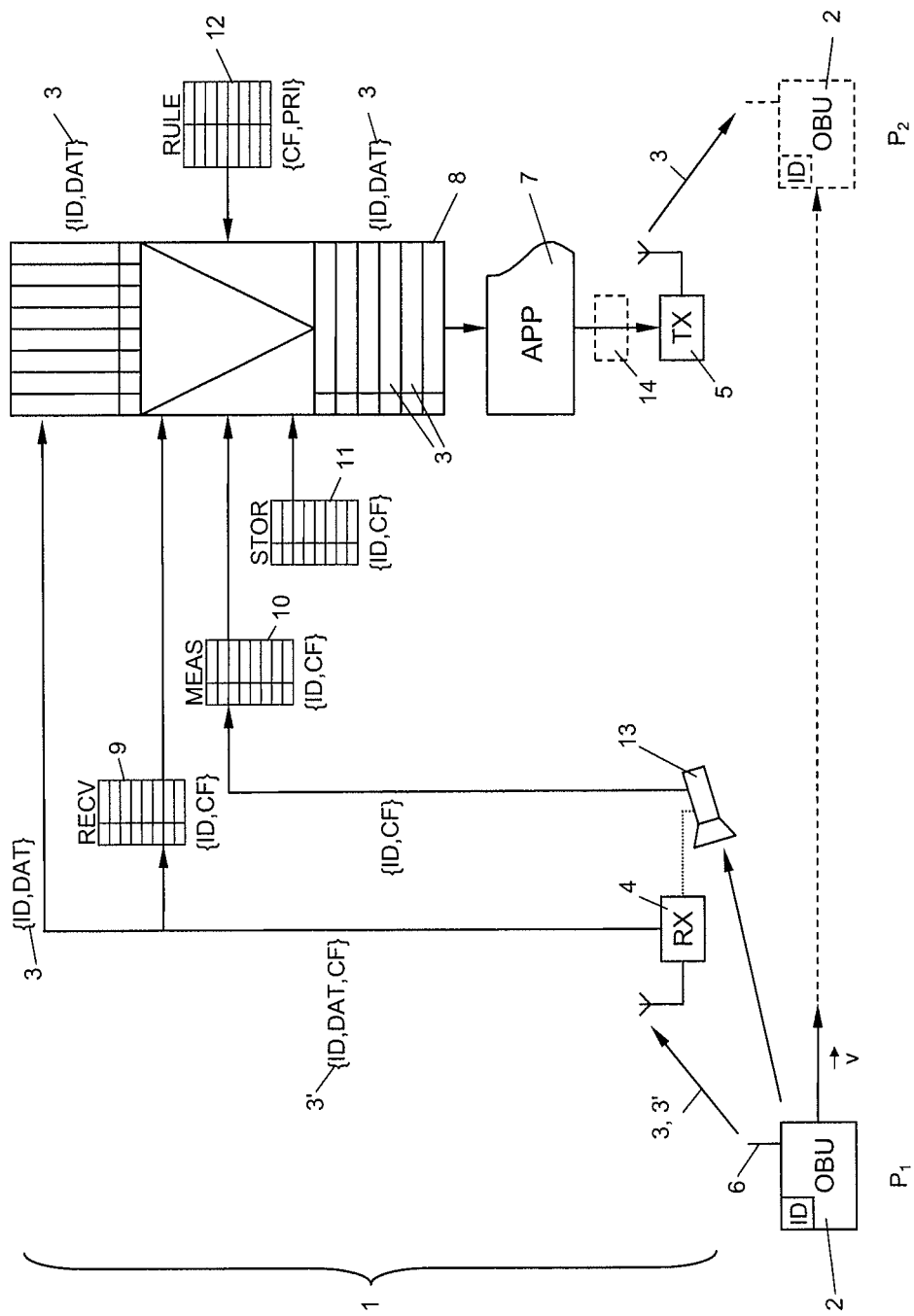
FIG. 2 is a block diagram and a signal flow diagram, according to some embodiments of the present invention.

FIG. 2 shows a modification of the radio beacon and the method of FIG. 1, which differs from FIG. 1 in that the buffer memory 8 with the sorting means 9-12 and the determining means 4, 13 lies at the input instead of the output of the software application 7. The method of the invention can also be used in order to prioritise the messages 3 sent by the OBUs 2 to the software application 7 for processing according to characteristics CF of the OBUs 2.

A further possibility is depicted in FIG. 2 by the block 14 in broken lines. The block 14 represents all the components of FIG. 1 at the output of the software application 7. Therefore, the messages 3 can be prioritised both at the input and at the output of one or more software applications 7 using the method outlined here.

It is understood that the blocks and components represented in FIGS. 1 and 2 need not necessarily be provided in separate physical units, but in an individual case can also be implemented—as far as possible—by corresponding software components of a computer program. Thus, the buffer memory 8 and/or one, several or all components of the sorting means 9—12, for example, can be configured as software components, in particular also as parts of the software application 7.

On this basis, the invention is not restricted to the represented embodiments, but covers all variants and modifications that fall within the framework of the attached claims.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for transmitting messages between a radio beacon and multiple onboard units with unique identifiers in a road communication system, wherein the messages provided with an identifier of a respective onboard unit are stored in a buffer memory of the radio beacon for sequential processing or dispatch, the method comprising:

determining, for each onboard unit entering a transmitting-receiving area of the radio beacon, at least one characteristic of the onboard unit by receiving and examining, in the radio beacon, information transmitted with a message from the onboard unit relating to said at least one characteristic of the onboard unit;

sorting the messages present in the buffer memory under the identifiers, depending on the characteristics determined for each identifier of a respective onboard unit; and sequentially processing or dispatching the messages from the buffer memory in the sequence they were sorted.

2. The method according to claim 1, wherein said characteristic is an operating mode, which the onboard unit was in before a first contact was made with the radio beacon in a working or resting mode.

3. The method according to claim 1, wherein the characteristic is a receive sensitivity or a transmitting power of the onboard unit.

4. The method according to claim 1, wherein the characteristic is an operating mode, which the onboard unit is in during transmission of the message.

5. The method according to claim 1, wherein the characteristic is a number of unsuccessful attempts by a given onboard unit to transmit a message to the radio beacon, prior to determining at least one characteristic of the given onboard unit.

6. The method according to claim 1, wherein the characteristic is a fill level of a memory of the onboard unit.

7. The method according to claim 1, wherein the characteristic is one or more of a position, and a motion vector of the onboard unit.

8. The method according to claim 1, wherein a previously stored list with characteristics and assigned sorting priorities is used for sorting the messages.

9. The method according to claim 1, wherein sorting the messages is performed again upon determination of a new characteristic.

10. A radio beacon for a road communication system for transmitting messages between the radio beacon and multiple onboard units with unique identifiers, comprising:

at least one buffer memory, in which the messages respectively provided with an identifier of an onboard unit are stored for sequential processing or dispatch; and a transceiver coupled to the buffer memory, the transceiver comprising:

a determining means for determining, for each onboard unit entering the transmitting-receiving area of the radio beacon, whether a message from an onboard unit is related to at least one characteristic of the onboard unit, by examining the message from the onboard unit, and a sorting means for the buffer memory coupled to the determining means and configured to sort the messages present in the buffer memory under the identifiers, depending on the characteristics determined for each identifier of a respective onboard unit.

11. The radio beacon according to claim 10, further comprising means for feeding messages into the buffer memory for dispatch to onboard units.

12. The radio beacon according to claim 10, further comprising at least one software application running on the radio beacon for receiving messages from the buffer memory in the sort sequence thereof for processing.

* * * * *